United States Patent [19]

Cummins

[11] Patent Number: 4,765,587
[45] Date of Patent: Aug. 23, 1988

[54] PULSE-WIDTH-MODULATED SOLENOID VALVE

[75] Inventor: Richard D. Cummins, Orchard Park, N.Y.

[73] Assignee: Moog Inc., East Aurora, N.Y.

[21] Appl. No.: 94,862

[22] Filed: Sep. 9, 1987

Related U.S. Application Data

[62] Division of Ser. No. 930,750, Nov. 13, 1986, Pat. No. 4,746,094.

[51] Int. Cl.$^4$ ............................................. F16K 31/06
[52] U.S. Cl. ........................... 251/129.19; 251/129.05; 251/129.14; 251/333
[58] Field of Search ....................... 251/129.19, 129.05, 251/333, 129.14

[56] References Cited

U.S. PATENT DOCUMENTS

| | | | |
|---|---|---|---|
| 3,737,141 | 6/1973 | Zevner | 251/129.19 X |
| 4,027,850 | 6/1977 | Allen | 251/129.19 |
| 4,638,837 | 1/1987 | Buike et al. | 251/129.05 X |
| 4,666,125 | 5/1987 | Marts et al. | 251/129.19 |

Primary Examiner—Arnold Rosenthal
Attorney, Agent, or Firm—Sommer & Sommer

[57] ABSTRACT

A pulse-width-modulated solenoid valve has a body provided with an elongated chamber. The body has inlet and outlet openings communicating with the chamber, and has a seat surrounding the inlet opening and arranged to face into the chamber. An armature is mounted in the chamber for movement therealong toward and away from the seat. A coil is mounted on the body, and is adapted to be selectively energized to move the armature in one direction relative to the body. A return spring is arranged to urge the armature to move in the opposite direction relative to the body. The improvement provides a valve element which is mounted for movement with the armature toward and away from the seat, but also mounted for movement relative to the armature when the element engages the seat, such that the mass of the armature will not exert a substantial force against the seat. According to the improvement, the operating life of the valve may be greatly extended.

11 Claims, 4 Drawing Sheets

PULSE-WIDTH-MODULATED SOLENOID VALVE

This is a divisional of co-pending application Ser. No. 930,750, filed on Nov. 13, 1986, now U.S. Pat. No. 4,746,094, dated May 24, 1988.

BACKGROUND OF THE INVENTION

1. Field of the Invention

The present invention relates generally to the field of solenoid valves, and, more particularly, to an improved pulse-width-modulated (PWM) solenoid valve having a long service life.

2. Description of the Prior Art

Solenoid valves are, of course, well known. Generally, these valves have a poppet member mounted within a body for movement toward and away from a fixed seat. An armature is normally connected to the poppet member. The poppet member is typically biased to move to a closed position by a return spring. However, it has been Applicant's experience that such solenoid valves do not have a long life when controlled by a pulse-width-modulated technique, wherein the solenoid valve is typically opened and closed two or three hundred times each second. One reason for limited life is that the combined mass of the armature and poppet impacts repeatedly against the seat, causing deformation which adversely affects valve leakage and flow characteristics. This is believed to substantially shorten the operating life of the valve. Other details of prior art PWM solenoid valves are shown and described in Technical Bulletin 151, "Electropneumatic Servoactuation: An Alternative to Hydraulics for Some Low Power Applications", Moog Inc. (1984).

SUMMARY OF THE INVENTION

The present invention provides an improvement for use in a pulse-width-modulated solenoid valve. Such a valve has a body provided with a chamber, and further provided with inlet and outlet openings communicating with this chamber. The body also has a fixed seat surrounding one of these openings, and arranged to face into the chamber. An armature is mounted in the chamber for movement toward and away from the seat. A coil is mounted on the body, and is adapted to be momentarily energized to move the armature in one direction relative to the body. Return means, such as a return spring, is operatively arranged to move the armature in the opposite direction relative to the body when the coil is de-energized. The improvement broadly comprises: a poppet valve element generally mounted for movement with the armature toward and away from the seat, and also mounted for specific movement relative to the armature such that when the element engages the seat, the mass of the armature will not exert a substantial force against the seat. According to the improvement, the operating life of the seal between the element and seat may be greatly extended.

Accordingly, the general object of the invention is to provide an improved solenoid valve.

Another object is to provide an improvement for use in a pulse-width-modulated solenoid valve.

Still another object is to provide an improvement in a pulse-width-modulated solenoid valve, which improvement affords the capability of greatly extending the operative life of the valve.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" refer to the orientation of a surface relative to its axis of elongation, or axis of rotation, as appropriate. Unless otherwise indicated, the word "fluid" is intended to include both a liquid and a gas.

Figure 1:
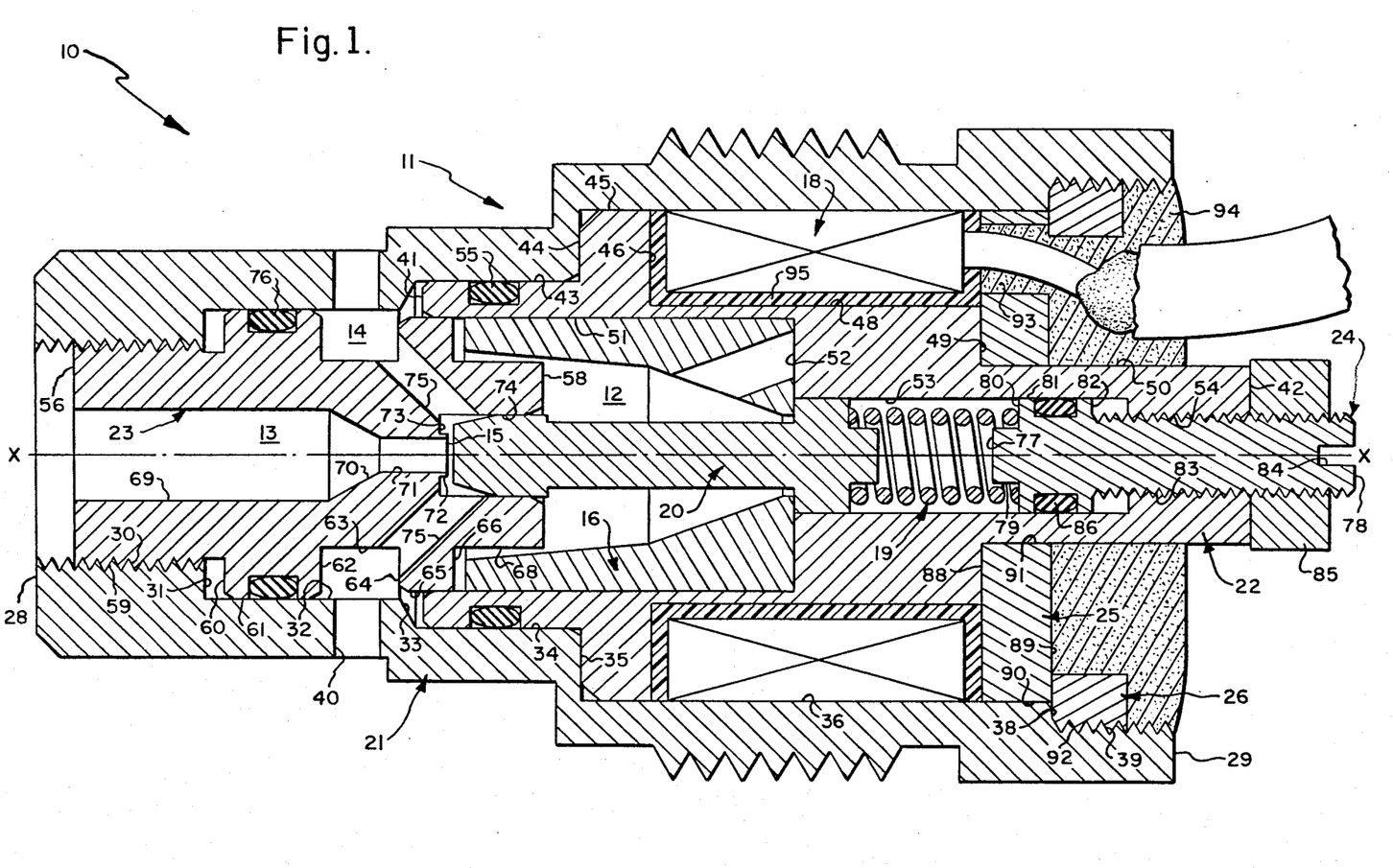
FIG. 1 is a fragmentary longitudinal vertical sectional view of a first form of an improved pulse-width-modulated solenoid valve incorporating the present improvement, this view showing the poppet valve element as having been displaced rightwardly off the seat.
Figures 2, 3:
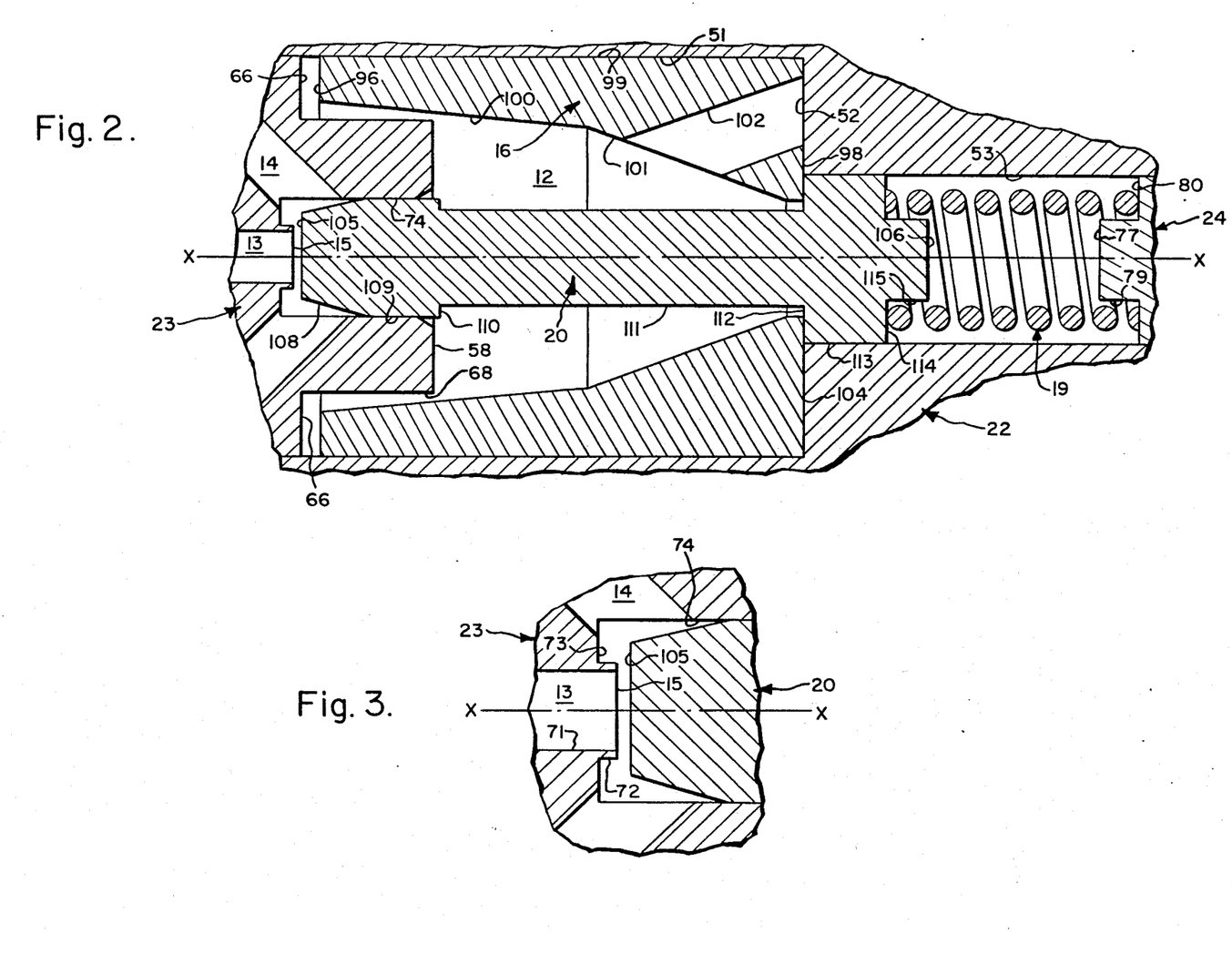
FIG. 2 is an enlarged detailed view of the poppet, the armature and the return spring shown in FIG. 1.
FIG. 3 is a further enlarged detailed view showing the left marginal end portion of the poppet member and the seat.
Figure 4:
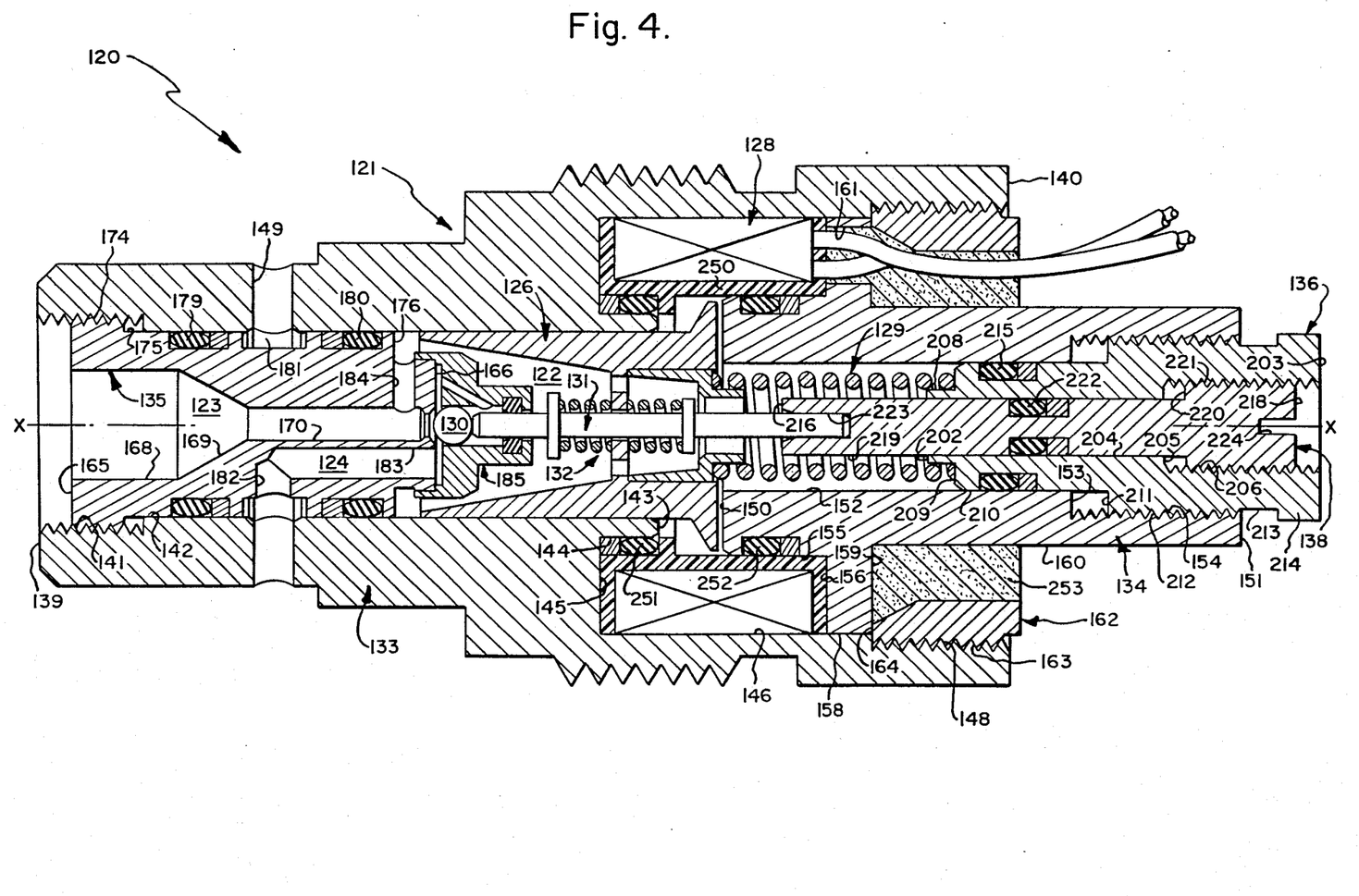
FIG. 4 is a fragmentary longitudinal vertical sectional view of a second form of an improved pulse-width-modulated solenoid valve incorporating the present improvement, this view showing a ball valve element as having been displaced off the seat.
Figures 5, 6:
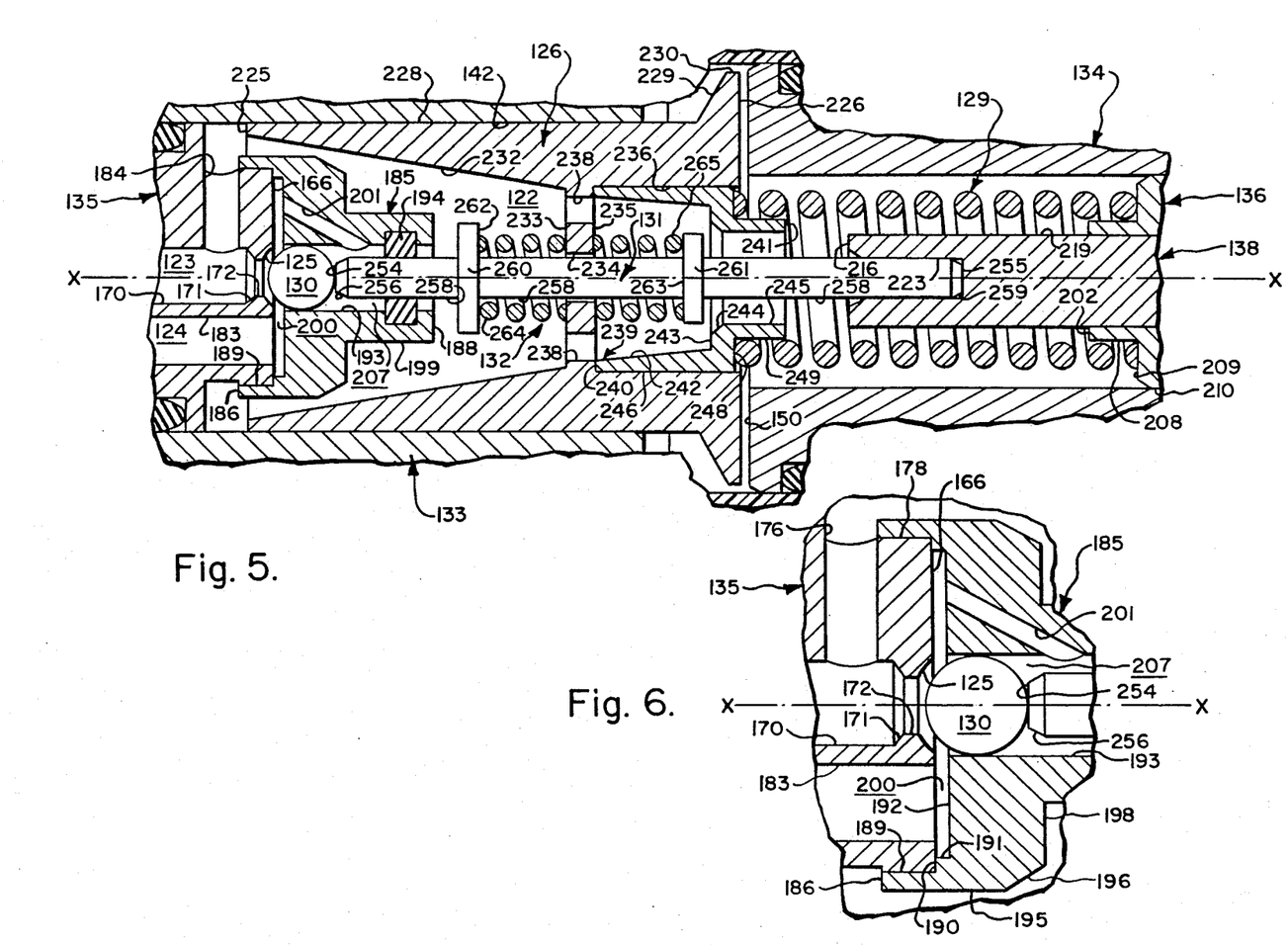
FIG. 5 is an enlarged detailed view of the plunger and ball valve element shown in FIG. 4.
FIG. 6 is a further enlarged detailed view of the left marginal end portion of the plunger, and also showing the ball valve element and the seat.

The present invention provides an improved pulse-width-modulated (PWM) solenoid valve, of which two presently-preferred embodiments are disclosed. The first embodiment is illustrated in FIGS. 1-3, and the second is shown in FIGS. 4-6. For the convenience of the reader, these two embodiments will be described seriatim herebelow.

First Embodiment (FIGS. 1-3)

Referring now to FIG. 1, a first embodiment of the improved PWM solenoid valve is generally indicated at 10. Valve 10 is shown as broadly including a multipart assembled body, generally indicated at 11, provided with a horizontally-elongated chamber 12, with inlet and outlet openings 13,14, respectively, communicating with this chamber, and with a seat 15 facing rightwardly into the chamber; an armature 16 mounted in the chamber for horizontal sliding movement therealong toward and away from the seat; a coil 18 mounted on the body and adapted to be momentarily energized by suitable means (not shown) to selectively move the armature rightwardly relative to the body; and return means, such as a return spring 19, for continuously urging the armature to move leftwardly relative to the body. The improvement broadly includes: a valve element, such as poppet member 20, mounted for general movement with the armature toward and away from the seat, but also specifically mounted for movement relative to the armature such that when the poppet member moves leftwardly to engage the seat, the mass of the armature will be effectively separated or uncoupled from the mass of the poppet. By this arrangement, the mass of the armature will not impact against the seat, and the operational life of the seal formed between the seat and the poppet can be greatly extended.

Still referring principally to FIG. 1, the assembled body is shown as broadly including an outer part 21, an inner part 22, a seat member 23 mounted within outer part 21, a return spring adjustment member 24, a retaining plate 25 engaging the inner part, and a retaining ring 26 engaging the retaining plate and the outer part.

More particularly, the body outer part 21 is depicted as being a stepped tubular member, generated about horizontal axis x-x, having an annular vertical left end face 28; an annular vertical right end face 29; and an inner surface which sequentially includes (from left to right): an internally-threaded portion 30 extending rightwardly from left end face 28, a rightwardly-facing annular vertical surface 31, an inwardly-facing horizontal cylindrical surface 32, an inwardly- and rightwardly-facing frusto-conical surface 33, an inwardly-facing horizontal cylindrical surface 34, a rightwardly-facing annular vertical surface 35, an inwardly-facing horizontal cylindrical surface 36, a rightwardly-facing annular vertical surface 38, and an internally-threaded portion 39 continuing rightwardly therefrom to join right end face 29. The outer surface of body outer part generally parallels the inner surface, just described, but is not deemed material to an understanding of the improvement. Hence, a description of such outer surface has been omitted in the interest of clarity. However, a vertical hole 40 is shown as extending diametrically through an intermediate portion of the outer part to form a portion of the outlet opening 14.

The body inner part 22 is also shown as being a horizontally-elongated stepped tubular member, also generated about axis x-x, which has been inserted into the open right end of the body outer part. Specifically, the inner part has an annular vertical left end face 41; an annular vertical right end face 42; and an outer surface which sequentially includes (from left to right): an outwardly-facing horizontal cylindrical surface 43 extending rightwardly from left end face 41, a leftwardly-facing annular vertical surface 44, an outwardly-facing horizontal cylindrical surface 45, a rightwardly-facing annular vertical surface 46, an outwardly-facing horizontal cylindrical surface 48, a rightwardly-facing annular vertical surface 49, and an outwardly-facing horizontal cylindrical surface 50 continuing rightwardly therefrom to join right end face 42. The inner surface of this body inner part sequentially includes (from left to right): an inwardly-facing horizontal cylindrical surface 51 extending rightwardly from left end face 41, a leftwardly-facing annular vertical surface 52, an inwardly-facing horizontal cylindrical surface 53, and an internally-threaded portion 54 continuing rightwardly therefrom to join right end face 42. Inner part 22 has been inserted leftwardly into the open right end of outer part 21 such that inner part surfaces 41,43, 44,45 are arranged to face outer part surfaces 33,34,35,36, respectively. An O-ring 55 seals the joint between surfaces 34,43.

Seat member 23 is shown as being a specially-configured horizontally-elongated tubular member operatively mounted within the left marginal end portion of the body outer part. Specifically, the seat member has an annular vertical left end face 56; an annular vertical right end face 58; and an outer surface which sequentially includes (from left to right): an externally-threaded portion 59 extending rightwardly from left end face 56, a leftwardly-facing annular vertical surface 60, an outwardly-facing horizontal cylindrical surface 61, a rightwardly-facing annular vertical surface 62, an outwardly-facing horizontal cylindrical surface 63, a leftwardly-facing annular vertical surface 64, an outwardly-facing horizontal cylindrical surface 65, a rightwardly-facing annular vertical surface 66, and an outwardly-facing horizontal cylindrical surface 68 continuing rightwardly therefrom to join right end face 58. The innersurface of seat member 23 sequentially includes (from left to right): an inwardly-facing horizontal cylindrical surface 69 extending rightwardly from left end face 56, an inwardly-and leftwardly-facing frusto-conical surface 70, an inwardly-facing horizontal cylindrical surface 71, a rightwardly-facing annular vertical seat 15, an outwardly-facing horizontal cylindrical surface 72 extending leftwardly therefrom (FIG. 3), a rightwardly-facing annular vertical surface 73, and an inwardly-facing horizontal cylindrical surface 74 continuing rightwardly therefrom to join right end face 58. Surfaces 71,15,72 define an integrally-formed tubular collar which extends rightwardly into chamber 12, and which collar terminates in a rightwardmost seat 15. Inclined holes 75,75 communicate inner surfaces 73,74 with outer surfaces 63,64, and formanother portion of the outlet opening. The seat member is threaded into engagement with the body left part such that seat member surfaces 60,61 are arranged to face outer part surfaces 31,32, respectively. An O-ring 76 seals the joint between surfaces 61,32. The inlet opening 13, is bounded by surfaces 69,70,71.

The return spring adjustment member 24 is a specially-configured solid member, also generated about axis x-x, which is operatively mounted within the right marginal end portion of the body inner part. Member 24 has a circular vertical left end face 77, a circular vertical right end face 78, and an outer surface which sequentially includes (from left to right): an outwardly-facing horizontal cylindrical surface 79 extending rightwardly from left end face 76, a leftwardly-facing annular vertical surface 80, an outwardly-facing horizontal cylindrical surface 81, a rightwardly-facing annular vertical surface 82, and an externally-threaded portion 83 continuing rightwardly therefrom to join right end face 78. A slot 84 extends leftwardly into member 24 from its right end face to accept and accommodate a suitable turning tool, such as a screwdriver, by which member 24 may be selectively rotated relative to the body inner part. The angular position of the adjusting member 24 relative to the body inner part may be fixed by selectively tightening a locknut 85, which is threaded onto the adjustment member and is arranged to be tightened against inner part right end face 42. Surfaces 81,53 are arranged in closely-spaced facing relation, and the joint therebetween is sealed by means of an O-ring 86. Thus, the adjustment member may be selectively rotated relative to the body inner part to vary the position of its surface 80 relative to the body inner part.

Retaining plate 25 is shown as being an annular ring-like member, somewhat resembling a flat washer, and surrounds the rightwardly-extending stem of the body inner part. Specifically, the retaining plate has an annular vertical left end face 88 arranged to abut inner part surface 49, has an annular vertical right end face 89, has a horizontal cylindrical outer surface 90 arranged to face outer part surface 36, and has a horizontal cylindrical inner surface 91 aranged to face inner part surface 50. Retaining plate 25 is held in this position, preventing unintended separation of the body inner and outer parts, by means of retaining ring 26. Ring 26 is an annular ring-like member having an externally-threaded portion 92 arranged in mating engagement with body outer part threaded portion 39. The retaining plate is further shown as being provided with an eccentrically-positioned horizontal through-hole 93 to accommodate passage of the electrical conductors leading to the coil. The annular recess defined between the right marginal end portion of the body outer part, the retaining ring, the retaining plate, and the right marginal end portion of the body inner part, is shown as being filled with a suitable sealant, such as a potting compound 94.

The coil 18 is shown as being an annular member wound around a dielectric bobbin 95. Bobbin 95 is shown as having an annular vertical left end face and an inwardly-facing horizontal cylindrical inner surface, arranged to face inner part surfaces 46,48, respectively. The annular vertical right end face of the bobbin is engaged by the retaining plate 25, and the opening 93 about the coil conductors and is also filled with the potting compound.

As best shown in FIG. 2, armature 16 is shown as being a specially-configured annular member operatively arranged within chamber 12 for horizontal sliding movement between body surfaces 66,52. Specifically, the armature has an annular vertical left end face 96; an annular vertical right end face 98; and an outwardly-facing horizontal cylindrical outer surface 99 extending therebetween. The inner surface of the armature sequentially includes (from left to right): an inwardly- and leftwardlyfacing frusto-conical surface 100 extending rightwardly from left end face 96, and another leftwardly- and inwardly-facing frusto-conical surface 101 continuing rightwardly therefrom to join right end face 98. An upwardly- and rightwardly-inclined hole 102 communicates armature surfaces 101,98, and functions to provide a flow passage for any fluid trapped between armature right end face 98 and body inner part surface 52. Armature outer surface 99 is arranged to slidably engage inner part surface 51. Persons skilled in this art will readily appreciate that the radial clearance between armature outer surface 99 and body surface 51 forms a non-working radial air gap of substantially constant reluctance. However, the armature right end face 98 and body surface 52 form a working air gap of variable reluctance, depending upon the spacing therebetween, through which coil flux must pass. Thus, the armature is mounted on the body for horizontal sliding movement therealong, with armature surfaces 96,98 arranged to face body surfaces 62,52, respectively. When the coil is energized, armature 16 will move rightwardly relative to the body and toward the position shown in FIG. 2.

Still referring principally to FIG. 2, the poppet 20 is shown as being a specially-configured horizontally-elongated solid member, also generated about axis x-x. Specifically, the poppet has a circular vertical left end face 105; a circular vertical right end face 106; and an outer surface which sequentially includes (from left to right): a leftwardly- and outwardly-facing frusto-conical surface 108 extending rightwardly from left end face 105, an outwardly-facing horizontal cylindrical surface 109, a rightwardly-facing annular vertical surface 110, an outwardly-facing horizontal cylindrical surface 111, a leftwardly-facing annular vertical surface 112, an outwardlyfacing horizontal cylindrical surface 113, a rightwardly-facing annular vertical surface 114, and an outwardly-facing horizontal cylindrical surface 115 continuing rightwardly therefrom to join right end face 106. Poppet surfaces 109,113 are arranged to slidably engage body surfaces 74,53, respectively. Hence, the poppet is slidably mounted within the chamber for guided horizontal sliding movement relative to the body toward and away from seat surface 15. A portion of poppet surface 112 is arranged to selectively engage right end face 98 of the armature.

The return spring 19 is shown as being a compressed coil spring. The right end of spring 19 engages adjusting member surface 80, and the left end of this spring engages poppet surface 114. Thus, return spring 19 continuously urges poppet 20 to move leftwardly into fluid-tight sealing engagement with seat 15.

When coil 18 is de-energized, return spring 19 will expand to selectively displace the poppet 20 and the armature 16 leftwardly relative to the body. The poppet will move leftwardly to abut seat surface 15, and this will occur before armature left end face 96 abuts body surface 66. When the coil is energized, the coil flux will pull the armature rightwardly toward the position shown in FIG. 2. As this occurs, the armature right end face 98 will engage poppet surface 112, and will selectively move the poppet member rightwardly off seat 15. When the coil is subsequently de-energized, return spring 19 will again expand to displace the poppet and armature leftwardly until poppet surface 105 again sealingly engages seat surface 15. However, it should be clearly noted that the poppet will sealingly engage seat 15 before armature left end face 96 abuts body surface 66. Hence, only the momentum of the mass of the poppet will impact seat 15, with the armature being permitted some additional over-travel prior to engaging body surface 66. Thus, when the coil is energized, the armature and poppet member move rightwardly together. When the coil is de-energized, the armature and poppet initially move leftwardly together until the poppet engages seat 15. However, the armature may travel an additional distance before abutting body surface 66. The significance of this is that the mass of the poppet armature is effectively separated, isolated or uncoupled from the mass of the poppet when the poppet engages the seat. This separation of the mass of the armature from the mass of the poppet is believed to greatly extend the operating life of the seal between the poppet and seat, particularly when the repetition rate of the electrical signal supplied to the coil is high. When poppet surface 105 sealingly engages seat 15, flow from the inlet opening 13 to the outlet opening 14 will be blocked. However, when the coil has been energized to selectively displace the armature and poppet rightwardly, fluid may flow through the inlet opening 13, through the now-uncovered opening between the seat and the poppet, and through the outlet opening 14.

If desired, the tubular collar, upon which the seat is provided, may be formed of a relatively-hard material, and the poppet member may be formed of a relatively-soft material. This arrangement will insure that the collar will "coin" an appropriately-configured indentation in the poppet when the repetition rate is high, without adversely affecting the integrity of the fluid-tight seal therebetween. Likewise, the relatively-narrow annular seating surface formed by the tubular collar can undergo minor deformation during the coining process without materially changing the apparent valve orifice size, which is determined, in part, by the effective diameter of the seat.

Second Embodiment (FIGS. 4-6)

A second embodiment of an improved PWM solenoid valve incorporating the present improvement is shown in FIGS. 4-6.

This second embodiment, generally indicated at 120, is shown as broadly including a multi-part assembled body, generally indicated at 121, provided with a horizontally-elongated chamber 122, inlet and outlet openings 123,124, respectively, communicating with this chamber, and a seat 125 (FIG. 5) facing rightwardly into this chamber; an armature 126 mounted in the chamber for horizontal sliding movement therealong toward and away from the seat; a coil 128 mounted on the body and adapted to be selectively energized by suitable means (not shown) to move the armature rightwardly relative to the body; and return means, such as a return spring 129, for continuously urging the armature to move leftwardly relative to the body. In this embodiment, the improvement broadly includes: a ball valve element 130, a plunger member 131, and a cushioning means 132 operatively arranged between the armature and the plunger member. As with the first embodiment, the salient feature of this second embodiment is that when the ball, plunger and armature move leftwardly toward the seat, the mass of the armature will be effectively separated or uncoupled from the combined mass of the plunger and ball when the ball sealingly engages the seat. Hence, the operational life of the seal formed between the ball and the seat can be greatly extended.

The assembled body is shown as including an outer part 133, an inner part 134, a seat member 135, a return spring adjustment member 136, and a plunger guide 138.

The body outer part 133 is a specially-configured horizontally-elongated member, generated about horizontal axis x-x, and has annular vertical left and right end faces 139,140, respectively. The inner surface of body part 133 sequentially includes (from left to right): an internally-threaded portion 141 extending rightwardly from left end face 139, an inwardly-facing horizontal cylindrical surface 142, a rightwardly-facing annular vertical surface 143, an outwardly-facing horizontal cylindrical surface 144 extending leftwardly from surface 143, a rightwardly-facing annular vertical surface 145, an inwardly-facing horizontal cylindrical surface 146, and an internally-threaded portion 148 continuing rightwardly therefrom to join right end face 140. The outer surface of body outer part 133 is not deemed material to an understanding of the present improvement, and a description thereof has been omitted. A vertical hold 149 extends diametrically through the body outer part, and forms a portion of the outlet opening 124.

The body inner part is shown as being a horizontally-elongated tubular member, also generated about axis x-x, which has been inserted leftwardly into the open right end of the body outer part. Specifically, the body inner part 134 has an annular vertical left end face 150; an annular vertical right end face 151; and an inner surface which sequentially includes (from left to right): an inwardly-facing horizontal cylindrical surface 152 extending rightwardly from left end face 150, a rightwardly-facing annular vertical surface 153, and an internally-threaded portion 154 continuing rightwardly therefrom to join right end face 151. The outer surface of inner part 134 sequentially includes (from left to right): an outwardly-facing horizontal cylindrical surface 155 extending rightwardly from left end face 150, a leftwardly-facing annular vertical surface 156, an outwardly-facing horizontal cylindrical surface 158, a rightwardly-facing annular vertical surface 159, and an outwardly-facing horizontal cylindrical surface 160 continuing rightwardly therefrom to join right end face 151. Inner part surface 158 is arranged in closely-spaced facing relation to outer part surface 146. The inner part is further provided with an eccentrically-positioned horizontal through-hole 161 to accommodate passage of the conductors leading to coil 128. The body inner part 134 is held in this position by an annular retaining ring, generally indicated at 162, having an externally-threaded portion 163 matingly engaging threaded portion 148, and having a leftwardly-facing annular vertical surface 164 arranged to abut inner part surface 159.

The seat member 135 is shown as being a horizontally-elongated member, also generated about horizontal axis x-x, and operatively received in the left marginal end portion of the body outer part. Specifically, seat member 135 has an annular vertical left end face 165, and an annular vertical right end face 166. The inner surface of seat member 135 sequentially includes (from left to right): an inwardly-facing horizontal cylindrical surface 168 extending rightwardly from left end face 165; an inwardly-and leftwardly-facing frusto-conical surface 169, an inwardly-facing horizontal cylindrical surface 170, an inwardly- and leftwardly-facing frusto-conical surface 171 (FIG. 6), an inwardly-facing horizontal cylindrical surface 172, and a rightwardly- and inwardly-facing frusto-conical seat surface 125 continuing rightwardly therefrom to join right end face 166. Surface 125 forms the seat toward and away from which valve element 130 moves. The outer surface of seat member 135 sequentially includes (from left to right): an externally-threaded portion 174 extending rightwardly from left end face 165, an outwardly-facing horizontal cylindrical surface 175, a rightwardly-facing annular vertical surface 176, and an outwardly-facing horizontal cylindrical surface 178 (FIG. 6) continuing rightwardly therefrom to join right end face 166. Seat member surface 175 is arranged in closely-spaced facing relation to body outer part surface 142, and the joint therebetween is sealed by axially-spaced O-rings 179,180. An annular groove, generally indicated at 181, extends radially into seat member 135 from surface 175 between O-rings 179,180. Groove 181 communicates with an L-shaped passageway. This passageway includes a blind vertical hole 182 drilled upwardly into seat member 135, and intersected by a horizontal hole 183 drilled leftwardly into seat member 135 from its right end face 166. A vertical hole 184 communicates outer surface 178 with inner surface 170.

As best shown in FIGS. 5 and 6, a ball retainer 185 is shown as being operatively mounted on the right marginal end portion of seat member 135. Retainer 185 is shown as being a specially-configured horizontally-elongated member, also generated about axis x-x, having annular vertical left and right end faces 186,188, respectively. As best shown in FIG. 6, the inner surface of retainer 185 sequentially includes (from left to right): an inwardly-facing horizontal cylindrical surface 189 extending rightwardly from left end face 186 and arranged to face seat member surface 178, a leftwardly-facing annular vertical surface 190 arranged to abut seat member end face 166, an inwardly-facing horizontal cylindrical surface 191, a leftwardly-facing annular vertical surface 192, and an inwardly-facing horizontal cylindrical surface 193 continuing rightwardly therefrom to join right end face 188. Adverting now to FIG. 5, annular groove extends radially into the ball retainer from surface 193 to receive and accommodate a ring-like annular seal 194, which sealingly and slidably engages the left marginal rod end portion of plunger 131. The outer surface of the ball retainer is shown as sequentially including (from left to right): an outwardly-facing horizontal cylindrical surface 195 extending rightwardly from left end face 186, a rightwardly- and outwardly-facing frusto-conical surface 196, a rightwardly-facing annular vertical surface 198, and an outwardly-facing horizontal cylindrical surface 199 continuing rightwardly therefrom to join right end face 188. Surfaces 166,191,192 form an annular chamber 200 about the seat 125 and ball 130. An inclined hole 201 communicates retainer surfaces 192,193 such that the fluid pressure within left chamber 200 will also exist in the right chamber 207 between the ball and seal 194.

The ball valve element 130 is operatively arranged within the ball retainer for movement toward and away from seat surface 125.

Adverting now to FIG. 4, the return spring adjustment member 136 is shown as being a specially-configured member operatively mounted within the right marginal end portion of body inner part 134. Specifically, adjustment member 136 is shown as being a horizontally-elongated tubular member, generated about axis x-x, having annular vertical left and right end faces 202,203, respectively. The inner surface of adjustment member 136 is shown as sequentially including: an inwardly-facing horizontal cylindrical surface 204 extending rightwardly from left end face 202, a rightwardly-facing annular vertical surface 205, and an internally-threaded portion 206 continuing rightwardly therefrom to join right end face 203. The outer surface of adjustment member 136 is shown as including an outwardly-facing horizontal cylindrical surface 208, a leftwardly-facing annular vertical surface 209, an outwardly-facing horizontal cylindrical surface 210, a leftwardly-facing annular vertical surface 211, an externally-threaded portion 212, an outwardly-facing horizontal cylindrical surface 213, and a rightwardmost polygonal portion 214. Polygonal portion 214 is adapted to be grasped by a suitable turning tool, and rotated relative to the body inner part to selectively vary the position of surface 209 relative to the body inner part. Surfaces 210,152 are arranged in closely-spaced facing relation, and the joint therebetween is sealed by an O-ring 215.

The plunger guide 138 is shown as being a horizontally-elongated solid member operatively arranged within the return spring adjustment member 136. More particularly, plunger guide 138 has an annular vertical left end face 216; an annular vertical right end face 218; and an outer surface which sequentially includes (from left to right): an outwardly-facing horizontal cylindrical surface 219 extending rightwardly from left end face 216, a leftwardly-facing annular vertical surface 220, and an externally-threaded portion 221 continuing rightwardly therefrom to join right end face 218. Surfaces 219,204 are arranged in closely-spaced facing relation, and the joint therebetween is sealed by an O-ring 222. A blind hole 223 is shown as extending axially rightwardly into plunger guide 138 from its left end face 216, to receive and accommodate the right marginal end portion of plunger member 131. A diametrical slot 224 extends leftwardly into the plunger guide from its right end face 218 to receive and accommodate insertion of a suitable turning tool, such as a screwdriver, by which the plunger guide may be selectively rotated relative to the adjustment member.

As best shown in FIG. 5, the armature 126 is a specially-configured annular member operatively arranged within chamber 122 for horizontal sliding movement therealong. Specifically, the armature has annular vertical left and right end faces 225,226, respectively; and an outer surface which sequentially includes (from left to right): an outwardly-facing horizontal cylindrical surface 228 extending rightwardly from left end face 225, a leftwardly- and outwardly-facing frusto-conical surface 229, and an outwardly-facing horizontal cylindrical surface 230 continuing rightwardly therefrom to join right end face 226. Again, the radial clearance between armature outer surface 228 and outer body inner surface 142 forms a non-working radial air gap of substantially constant reluctance. Also, armature right end surface 226 and inner body left end face 150 form a working air gap of variable reluctance. The inner surface of the armature sequentially includes (from left to right): a leftwardly- and inwardly-facing frusto-conical surface 232, a leftwardly-facing annular vertical surface 233, an inwardly-facing horizontal cylindrical surface 234, a rightwardly-facing annular vertical surface 235, and an inwardly-facing horizontal cylindrical surface 236 continuing rightwardly therefrom to join right end face 226. A plurality of horizontal through-holes, severally indicated at 238, extend between armature surfaces 233,235 to permit the pressures on both sides of the inwardly-extending intermediate armature flange to equalize.

A spring retainer, generally indicated at 239, is shown as being operatively mounted on the armature. Specifically, retainer 239 has annular vertical left and right end faces 240,241, respectively; and an inner surface which sequentially includes (from left to right): a leftwardly- and inwardly-facing frusto-conical surface 242, a leftwardly-facing annular vertical surface 243, a leftwardly- and inwardly-facing frusto-conical surface 244, and an inwardly-facing horizontal cylindrical surface 245 continuing rightwardly therefrom to join right end face 241. The outer surface of spring retainer 239 sequentially includes (from left to right): an outwardly-facing horizontal cylindrical surface 246 extending rightwardly from left end face 240, a rightwardly-facing annular vertical surface 248, and an outwardly-facing horizontal cylindrical surface 249 continuing rightwardly therefrom to join right end face 241. Spring retainer 239 is shown as being operatively associated with the armature such that retainer surfaces 240,246 are arranged to face armature surfaces 235,236, respectively.

The return spring 129 is shown as being a coil spring which is compressed between adjustment member surface 209 and spring retainer surface 248. Spring 129 is compressed, and continuously urges the spring retainer 239 and armature 126 to move leftwardly relative to the body.

Coil 128 is shown as being wound around an outwardly-facing annular bobbin 250. The annular vertical left face of the bobbin is arranged to engage body outer part surface 145, with an O-ring 251 sealing the joint between the bobbin inner surface and body outer part surface 144. Another O-ring 252 is arranged to seal the joint between the inner surface of the bobbin and body inner part outer surface 155. The annular vertical right end face of the bobbin is shown as engaging body inner part surface 156. As in the first embodiment, the annular recess formed between retaining ring 162, and the body inner part 134 is shown as being filled with a suitable potting compound 253.

Referring now to FIG. 5, the plunger member 131 is shown as being operatively arranged within chamber 122 for horizontal movement toward and away from seat 125. Specifically, the plunger member is shown as being a horizontally-elongated rod-like member generated about axis x-x. Plunger member 131 has circular vertical left and right end faces 254,255, and an outer surface which sequentially includes (from left to right): a leftwardly- and outwardly-facing frusto-conical surface 256 extending rightwardly from left end face 254, an outwardly-facing horizontal cylindrical surface 258, and a rightwardly- and outwardly-facing frusto-conical surface 259 continuing rightwardly therefrom to join right end face 255. The diameter of plunger surface 258 is substantially equal to the diameter of the contact between the ball 130 and seat 125, when such elements engage one another. A pair of axially-spaced flanges 260,261 are shown as extending radially outwardly from plunger member surface 258. Left flange 260 has a rightwardly-facing annular vertical surface 262, while right flange 261 is shown as having a leftwardly-facing annular vertical surface 263.

The cushioning means 131 is shown as including a first spring 264 operatively compressed between left flange surface 262 and armature surface 233, and a second spring 265 operatively compressed between right flange surface 263 and armature surface 235. Each of these springs is continuously compressed, and therefore biases the plunger member to move to a certain centered position relative to the armature. These cushioning springs are preferably selected such that their spring rates will produce a desired flow characteristic.

The left marginal end portion of the plunger member is shown as sealingly and slidably penetrating seal member 194, with its left end face 254 engaging ball valve element 130. The right marginal end portion of the plunger member is shown as being received in plunger guide hole 223. In this regard, the diameter of plunger member surface 258 is less than the diameter of hole 223, so that fluid will not become entrapped between the right end face of the plunger member and the bottom of hole 223, and the pressure therebetween will be permitted to equalize with the pressure in chamber 122. If desired, a suitable vent opening could alternatively be provided in the plunger guide. It should be noted that all surfaces of plunger 131 rightwardly of seal 194, are exposed to the pressure within chamber 122, which, in turn, is at the inlet pressure by virtue of communicating passageway 184. Hence, because the diameter of plunger surface 258 is substantially equal to the diameter of the contact between the seated ball and seat, the rightwardly-acting force of the inlet pressure on the left surface of the seated ball will be substantially balanced by the leftwardly-acting force of the same pressure in chamber 122, acting on the various plunger surfaces to the right of seal 194. Hence, the ball and plunger are effectively "balanced" against variations in the inlet pressure. In this second embodiment, the term "valve member" refers collectively to ball 130 and plunger 131.

This second embodiment is assembled as shown in FIG. 4. When coil 128 is de-energized, return spring 129 will urge the armature, plunger and ball to move leftwardly relative to the body. However, the spacing between the various parts is such that, when the armature moves leftwardly, ball valve element 130 sealingly engages seat 125 before armature left end face 225 abuts body surface 176. Thus, as in the first embodiment, the second embodiment contemplates that some desirable over-travel of the armature occur after the ball valve element has engaged seat 125. Such relative motion between the ball/plunger member and the armature is accommodated by compression of cushioning spring 264 and expansion of spring 265. Thus, the mass of the armature is effectively separated and uncoupled from the mass of the plunger and ball member when the ball valve element engages seat 125.

The second embodiment shown in FIGS. 4-6 is also pressure-balanced. When the ball valve 130 engages its seat, the inlet pressure in inlet passageway 123 will also exist within chamber 122. Thus, by dimensioning and configuring the right marginal end portion of the plunger member to have substantially the same area as the area of the seat, the plunger member and the ball valve may be balanced against the inlet pressure.

Of course, the position of the valve seat 125 relative to the body may be adjusted by selectively rotating the seat member relative to the body. Similarly, the compressive displacement of return spring 129 may be adjusted by selectively rotating adjustment member 136 relative to the body. When the coil is energized, the coilflux will move the armature rightwardly relative to the body. When the coil is de-energized, return spring 129 will drive the armature, plunger and ball leftwardly, with the cushioning means 132 effectively separating the mass of the armature from the mass of the plunger and ball when ball valve element 130 sealingly engages seat 125. Such arrangement is believed to substantially increase the operating life of the structure, particularly during high repetition rates of current supplied to the coil.

Modifications

The invention contemplates that many changes and modifications may be made. As has been demonstrated, the valve element may be a poppet, or a ball, or may have some other shape or configuration. Similarly, the seat may be provided at the end of a tubular collar, may be a frusto-conical or spherically-segmentedsurface, or may have some other shape. Line contact between the valve element and seat is preferred, but this need not invariably obtain. The various parts and components may be configured to other shapes and dimensions, as desired. For example, the tubular collar may be fashioned on end of poppet to form a simple inversion of the valve elements. The salient feature of the invention is to selectively uncouple or separate the mass of the armature from the mass of the valve element when the latter engages the seat, so that, during high repetition rates, the armature will not exert a momentum force on the seat.

Therefore, while two preferred embodiments of the improved solenoid valve have been shown and described, and several modifications thereof discussed, persons skilled in this art will readily appreciate that various additional changes and modifications may be made without departing from the spirit of the invention, as defined and differentiated by the following claims.

What is claimed is:

1. A pulse-width-modulated solenoid valve, comprising:
   a body provided with a chamber, said body being provided with inlet and outlet openings communicating with said chamber, said body also having a tubular collar extending into said chamber and terminating in an annular seat surrounding one of said openings;
   an armature mounted in said chamber for movement toward and away from said seat;
   a coil mounted on said body and adapted to be selectively energized to move said armature in one direction relative to said body;
   return means for urging said armature to move in the opposite direction relative to said body; and
   a valve element mounted for movement with said armature toward and away from said seat and also mounted for movement relative to said armature, said valve element having a planar surface and being movable in one of said directions until said planar surface sealingly engages said seat to prevent flow through said one opening, said valve element being formed of a material less hard than that of said seat, the connection between said valve element and armature being such that when said valve element moves in said one direction and engages said seat the momentum of the mass of said armature will not exert a substantial force on said seat;
   whereby the life of the seal between said element and seat will be extended and said seat may coin a complementary indentation into said valve element without adversely varying the diameter of the orifice therebetween.

2. The improvement as set forth in claim 1 wherein said seat surrounds said inlet opening.

3. The improvement as set forth in claim 1 wherein said return means urges said armature to move toward said seat.

4. The improvement as set forth in claim 1 wherein said return means is a return spring acting between said body and one of said armature and element.

5. The improvement as set forth in claim 4 wherein said return spring acts between said body and said element.

6. The improvement as set forth in claim 5 wherein said return spring urges said element to move toward said seat.

7. The improvement as set forth in claim 1 wherein said element is a poppet member.

8. A pulse-width-modulated solenoid valve, comprising:
   a body provided with a chamber and provided with inlet and outlet openings communicating with said chamber, said body having first and second surfaces facing into said chamber and arranged in spaced facing relation to one another, said body also having a tubular collar extending into said chamber and terminating in an annular seat surrounding one of said openings;
   a movable valve member arranged in said chamber and slidably mounted within said body for movement normally toward and away from the surface of said seat, said valve member being formed of a material less hard than that of said collar, said valve member having a third surface;
   a return spring acting between said valve member and body for urging said valve member to move toward said seat;
   an armature arranged in said chamber for movement between said body first and second surfaces and mounted for movement relative to said valve member, said armature having a first surface arranged to face said body first surface and having a second surface arranged to face said body second surface, said armature second surface being adapted to be selectively engaged by said valve member third surface, the range of movement between said body and armature first surface being greater than the range of movement between said valve member and seat; and
   a coil mounted on said body and adapted to be energized to move said armature away from said first body surface against the opposing force of said return spring;
   whereby, when said coil is de-energized, said return spring will cause said valve member to move toward said seat and said valve member will engage said seat before said armature first surface engages said body first surface.

9. The improvement as set forth in claim 8 wherein said seat surrounds said inlet opening.

10. The improvement as set forth in claim 8 wherein said valve member is a poppet.

11. The improvement as set forth in claim 8 wherein said armature is annular and surrounds said movable valve member.

* * * * *